United States Patent
Murphy, III

(10) Patent No.: US 10,087,586 B2
(45) Date of Patent: Oct. 2, 2018

(54) LIQUID RUNOFF FILTRATION SYSTEM AND METHOD

(71) Applicant: John E. Murphy, III, Mobile, AL (US)

(72) Inventor: John E. Murphy, III, Mobile, AL (US)

( * ) Notice: Subject to any disclaimer, the term of this patent is extended or adjusted under 35 U.S.C. 154(b) by 0 days.

(21) Appl. No.: 15/798,341

(22) Filed: Oct. 30, 2017

(65) Prior Publication Data

US 2018/0119367 A1    May 3, 2018

Related U.S. Application Data

(60) Provisional application No. 62/496,777, filed on Oct. 28, 2016.

(51) Int. Cl.
| | | |
|---|---|---|
| E03F 5/04 | (2006.01) | |
| E01D 19/08 | (2006.01) | |
| E01C 11/22 | (2006.01) | |
| C02F 1/28 | (2006.01) | |
| B01D 15/00 | (2006.01) | |
| C02F 103/00 | (2006.01) | |

(52) U.S. Cl.
CPC ............ E01C 11/225 (2013.01); B01D 15/00 (2013.01); C02F 1/285 (2013.01); E01D 19/086 (2013.01); E03F 5/0404 (2013.01); C02F 2103/001 (2013.01)

(58) Field of Classification Search
CPC ..... E03F 5/0401; E03F 5/0404; E01C 11/223; E01C 11/224; E01C 11/225; E01D 19/086
USPC .... 210/747.3, 163, 164, 170.03; 404/2, 4, 5, 404/6
See application file for complete search history.

(56) References Cited

U.S. PATENT DOCUMENTS

| | | | | |
|---|---|---|---|---|
| 5,511,904 A | * | 4/1996 | Van Egmond | E03F 1/002 210/164 |
| 5,820,762 A | * | 10/1998 | Barner | E03F 5/0404 210/163 |
| 5,938,370 A | * | 8/1999 | Gzybowski | E01F 15/083 404/6 |
| 6,217,757 B1 | * | 4/2001 | Fleischmann | E03F 5/0404 210/163 |
| 6,337,025 B1 | * | 1/2002 | Clemenson | B01J 20/22 210/163 |
| 6,485,639 B1 | * | 11/2002 | Gannon | B01D 15/00 210/170.03 |
| 6,793,811 B1 | * | 9/2004 | Fleischmann | E03F 5/0404 210/163 |
| 8,137,564 B2 | * | 3/2012 | Gannon | B01D 17/005 210/163 |
| 8,347,424 B2 | * | 1/2013 | Wroblewski | E03F 5/0407 210/164 |

* cited by examiner

*Primary Examiner* — Christopher Upton
(74) *Attorney, Agent, or Firm* — AdamsIP, LLC; Stephen Thompson; J. Hunter Adams

(57) ABSTRACT

A system and method for treating liquid runoff from bridge decks or other types of roadways are provided. The system includes vertical scuppers positioned at low points along a length of a bridge deck. Each scupper has a removable tube fitted inside the scupper with a filtration media for treating liquid runoff such as stormwater. During rainfall events, liquid runoff gravity flows downward through the tubes and the filtration media inside the tubes so that the liquid is treated before being discharged to the environment. The tubes can be removed to periodically replace the filtration media.

20 Claims, 5 Drawing Sheets

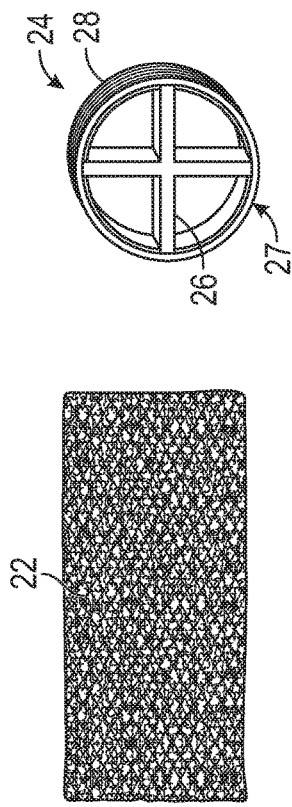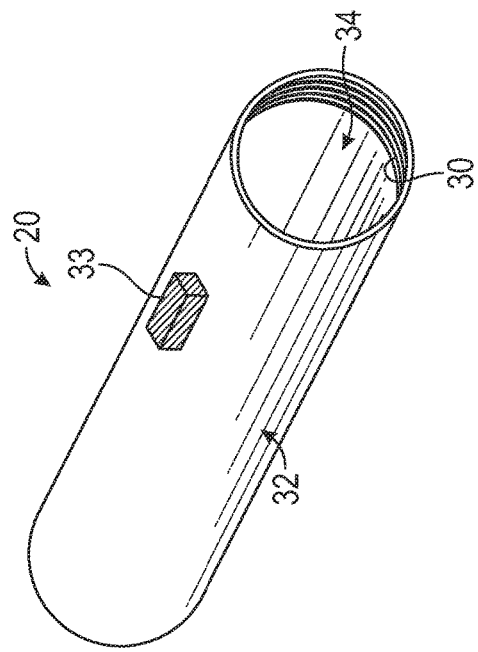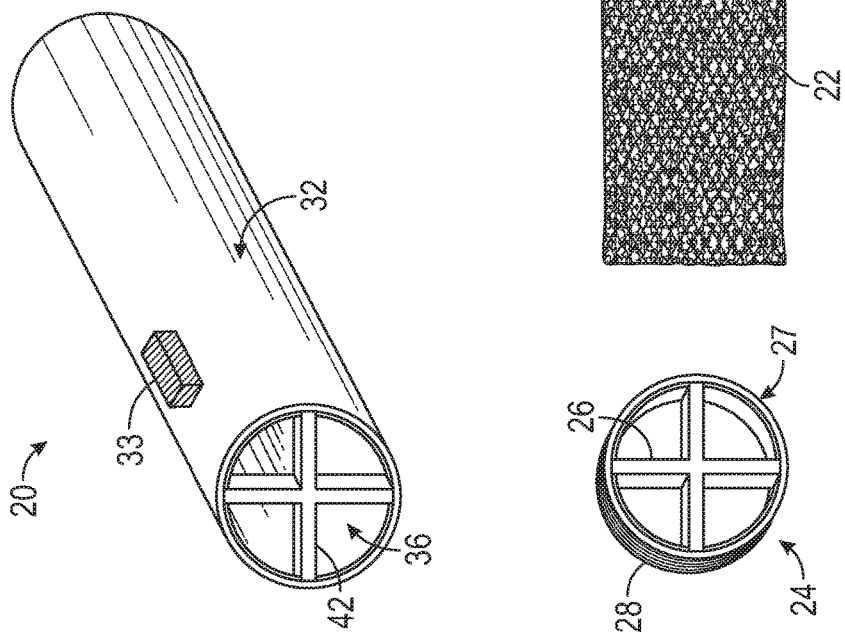
FIG. 2
FIG. 3

LIQUID RUNOFF FILTRATION SYSTEM AND METHOD

CROSS-REFERENCE TO RELATED APPLICATIONS

This application claims priority to U.S. Provisional Patent Application No. 62/496,777, entitled "METHOD TO SEPARATE HYDROCARBONS, TSS, AND OTHER CONTAMINANTS FROM STORMWATER DISCHARGED FROM BRIDGES, ROADWAYS, AND OTHER STRUCTURES OR CONVEYANCES IN NEW OR RETROFIT APPLICATIONS," filed Oct. 28, 2016, which application is incorporated herein in its entirety.

FIELD OF THE DISCLOSURE

The subject matter of the present disclosure refers generally to a liquid runoff filtration system and method for treating runoff from a surface such as a roadway.

BACKGROUND

Many efforts have been made to eliminate the effects of pollution in creeks, streams, rivers, bays, and other navigable and non-navigable bodies of water. One important source of water pollution is stormwater runoff from roads and bridges. Stormwater runoff occurs when stormwater generated from precipitation or melting events contacts a surface impervious to liquids, such as paved roadways. Such roadways are used by millions of vehicles, including trucks carrying various types of cargo. Considering the number of vehicles travelling on roadways, contaminants are inevitably released onto roadways, both intentionally and unintentionally. Such contaminants may include hydrocarbons such as engine oil, gasoline, or other types of automotive fluids released due to mechanical failure. In addition, other sources of contaminants on roadways may include individuals improperly disposing of various types of waste on roadways, contaminants being improperly secured on or within vehicles, resulting in unintentional release, and soil erosion during construction and after construction of roads and bridges.

On many roadways, pollutants simply run off the roadway with stormwater and flow onto land, which may result in pollutants released into groundwater, or eventually into water bodies via creeks, streams, ditches, etc. For elevated roadways, many bridges have scupper holes located at spaced intervals on a low side of the bridge deck to allow drainage from the bridge. The release of pollutants is particularly problematic on bridges over water bodies into which pollutants may be directly discharged from the roadway, though pollutants discharged from overland roadways also result in runoff into water bodies. Some attempts have previously been made to reduce pollutant runoff from roadways. However, known systems and method for reducing pollutant discharge have numerous problems and tradeoffs that may limit the performance of such systems and reduce the capacity to effectively and economically reduce pollutants. Such systems and methods typically include large piping systems through which stormwater runoff flows to large treatment structures or ponds, which may occupy large tracts of land to store and treat stormwater prior to its release into the environment. In addition, these systems are generally expensive to operate and maintain.

As such, there is a need in the art for a system and a method for treating runoff from roadways that does not require large treatment structures or tracts of land.

SUMMARY

In one aspect, a filtration system for treating liquid runoff from a roadway or similar impervious surface is provided. The system may be utilized to treat stormwater runoff carrying pollutants or other types of contaminants. The system comprises a roadway having a scupper extending through the roadway between a top surface of the roadway and a bottom side of the roadway. A plurality of spaced scupper may be disposed along a length of the roadway for treating liquid runoff from the roadway. A water filtration media is disposed within the scupper. The filtration media is preferably a polymer material that provides filtration, absorption, and/or adsorption of contaminants contained in water that passes through the media. The filtration media may be contained within a mesh sock or similar structure to contain the media while allowing water to flow through. In a preferred embodiment, the scupper is defined by a vertical tube installed within an opening in the roadway. The tube may be cast into the roadway during construction of the roadway, or the tube may be secured to an existing roadway with concrete inserts or another suitable type of fastener. The mesh sock is placed inside the tube so that water on the top surface of the roadway gravity flows down through the tube, thereby flowing through the filtration media for treatment of the water for contaminants. The tube preferably has a lower support structure secured to a lower end of the tube. The support structure extends transversely across an opening at the lower end of the tube and supports the mesh sock containing the filtration media while allowing water to flow through the tube. In a preferred embodiment, the roadway is a bridge, though the roadway may also be an overland roadway, in which case piping may convey treated water to a discharge point after the water exits the opening at the lower end of the tube.

In a preferred embodiment, the system further comprises a cap removably secured to an upper end of the tube. When secured in place, the cap prevents unintentional removal of the mesh sock containing the filtration media but allows water to gravity flow downward into the tube through the cap through openings in the cap. The cap may be removed in order to periodically remove and replace the filtration media and then re-secured to the upper end of the tube.

In a preferred embodiment, the filtration system comprises an outer tube and an inner tube disposed within the outer tube and removably secured to the outer tube. The outer tube is installed within the opening in the roadway and defines the scupper. The filtration media is disposed within the inner tube. The outer tube is permanently installed in the roadway, and the inner tube may be removed periodically to replace the filtration media, which may be replaced by replacing the inner tube with a new inner tube having new filtration media pre-installed within the inner tube. This may allow filtration media in a plurality of inner tubes spaced along a length of roadway to be replaced quickly.

In a preferred embodiment, the filtration system further comprises a barrier rail that extends upwardly from the top surface of the roadway along at least one side of the roadway outside of traffic lanes with a shoulder area of the roadway between the rail and traffic lanes. The barrier rail has a second scupper extending horizontally through the rail and positioned at a defined distance above the top surface of the roadway. The roadway slopes slightly downward toward the barrier rail to form a low point in the roadway, which is located in the shoulder area of the roadway. The vertical scupper formed by the outer tube is located in the area of the low point so that stormwater runoff will gravity flow through the vertical scupper. In heavy rainfall events, if the vertical scuppers located along the roadway cannot provide sufficient capacity to prevent stormwater accumulation, then the horizontal scupper in the barrier rail will function as a bypass allowing untreated stormwater to be discharged from the roadway. This is a safety feature to prevent accumulation of water in traffic lanes. The road, barrier, and horizontal scupper are designed so that accumulation will only occur outside of traffic lanes before accumulated water begins to flow through the horizontal scupper in the rail. The roadway is sloped slightly downward toward the rail to prevent stormwater accumulation in traffic lanes and limit accumulation to areas outside traffic lanes such as the shoulder area of the roadway. If accumulation occurs, the accumulated water will flow through the bypass before accumulating in traffic lanes.

The present filtration system is particularly advantageous when vertical scupper tubes are installed in an elevated roadway such as a bridge deck so that stormwater runoff may be treated before being discharged to the environment. Many bridges currently in use already have scupper holes in the bridge deck to allow direct drainage of untreated water. The present filtration system may be part of new roadway design and construction or may be retrofitted to an existing roadway. When retrofitted, the outer tube may have a flange at the upper end of the tube to provide a means of fastening the tube to the bridge deck.

This present filtration system allows for the filtration media to be installed safely below the driving surface of a bridge deck or other type of roadway. The present system allows for simple and quick inspection of the filtration media, as well simple and quick removal and replacement of filtration media, which can be accessed from the bridge deck.

The foregoing summary has outlined some features of the apparatus and methods of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purposes of the device and methods disclosed herein. Those skilled in the pertinent art should also realize that such equivalent designs or modifications do not depart from the scope of the device and methods of the present disclosure.

DESCRIPTION OF DRAWINGS

These and other features, aspects, and advantages of the present disclosure will become better understood with regard to the following description, appended claims, and accompanying drawings where:

FIG. 2 shows a perspective view of components of a filtration system in accordance with the present disclosure.

FIG. 3 shows a perspective view of components of a filtration system in accordance with the present disclosure.

DETAILED DESCRIPTION

Figure 1:
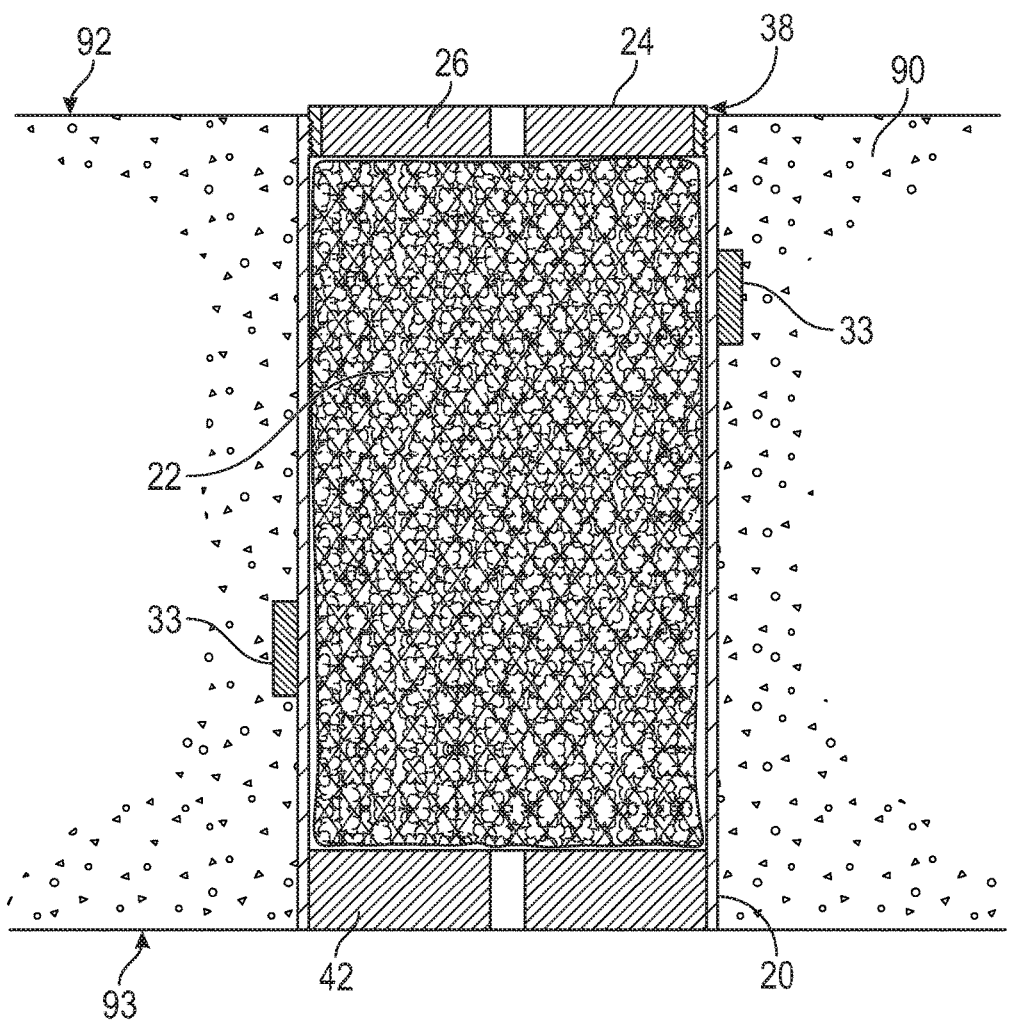
FIG. 1 shows a cross-sectional view of a filtration system installed in a roadway in accordance with the present disclosure.

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility). The term "removably secured" and grammatical equivalents thereof are used herein to mean the joining of two components in a manner such that the two components are secured together, but may be detached from one another and re-secured together without requiring the use of specialized tools. As used herein, the term "runoff" refers to any liquid that flows over an impervious surface and may include stormwater runoff, such as from roads or bridges, or liquids intentionally applied to a surface. As used herein, the term "roadway" and grammatical equivalents thereof may refer to any ground-level roadway that directly contacts the ground or to any roadway elevated above the ground and supported by support structures, which may include bridges or other types of elevated roadways. A roadway may be constructed of concrete, asphalt, or any other material of construction suitable for providing an impervious driving surface for automobiles or other types of motorized vehicles. A roadway may additionally include other impervious surfaces used for non-vehicular traffic, such as an elevated walkway. As used herein, the term "scupper" refers to any opening in a structure that allows liquid to drain and may include horizontal or vertical scuppers. Vertical scuppers are configured to allow liquid to gravity flow through the scupper from a high point to a low point and may be positioned in a vertical plane or may be positioned at an angle to the vertical plane. As used herein, the term "filtration media" may refer to any substance inside a filter that changes the quality of water flowing through a filter, such as for the purpose of removing contaminants from the water flowing through the media. Filtration media may include absorptive polymers, such as polypropylene or polyolefin-based hydrophobic absorbents, adsorptive material such as activated carbon, or other media such as sand, crushed rock, peat, wood chips, foam, fabrics such as geo-textile fabrics, any combinations thereof, or any other material suitable for filtering specific contaminants from a liquid stream flowing through the filter.

Figure 9:
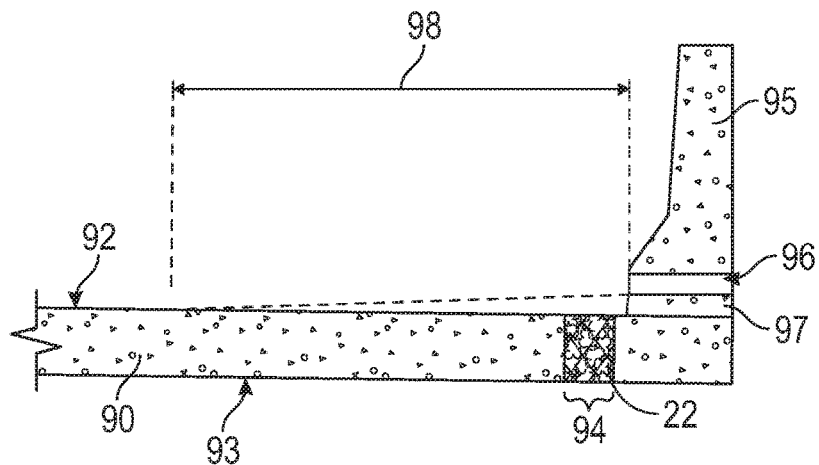
FIG. 9 shows a cross-sectional view of a filtration system installed in a roadway in accordance with the present disclosure.

In one aspect, a filtration system for treating liquid runoff from a roadway or similar impervious surface is provided. In one embodiment, the surface is a bridge deck of a bridge used for carrying automobile traffic. FIG. 9 illustrates a bridge deck 90 with the present system installed thereon, though the system may also be installed on other types of roadways or impervious surfaces. As seen in FIGS. 1 and 9, the system comprises a roadway 90 having a scupper 94 extending through the roadway 90 between a top surface 92 of the roadway and a bottom side 93 of the roadway 90. A filtration media 22 is disposed within the scupper. The filtration media 22 is preferably a polymeric material, such as polypropylene, that provides filtration, absorption, and/or adsorption of contaminants contained in water runoff from the surface 92 that passes through the media 22, such as stormwater runoff carrying pollutants or other contaminants from the roadway surface 92. Different types of filtration media 22 may be utilized for varying applications. For instance, the media chosen for a particular application may be used to remove or reduce levels of hydrocarbons, total suspended solids (TSS), heavy metals, or other pollutants or contaminants that may be released onto roadways. Levels of pollutants may vary by location, traffic count, grade of a bridge, and other factors, and the present system may be customized according to a target capacity and/or pollutant content in stormwater runoff.

Figure 5:
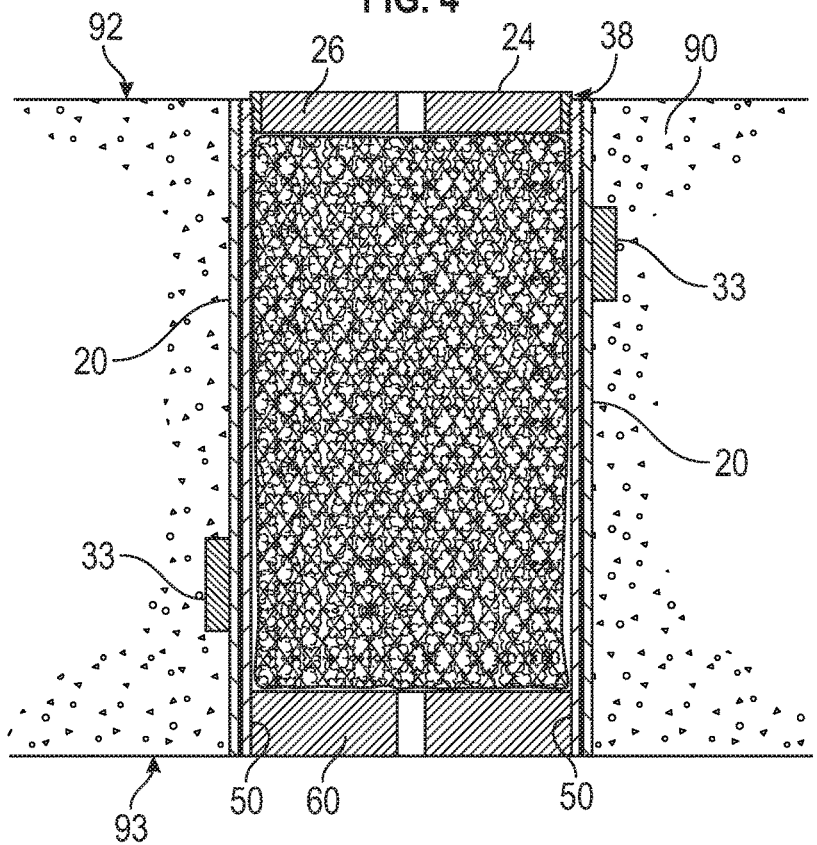
FIG. 5 shows a cross-sectional view of a filtration system installed in a roadway in accordance with the present disclosure.
Figure 6:
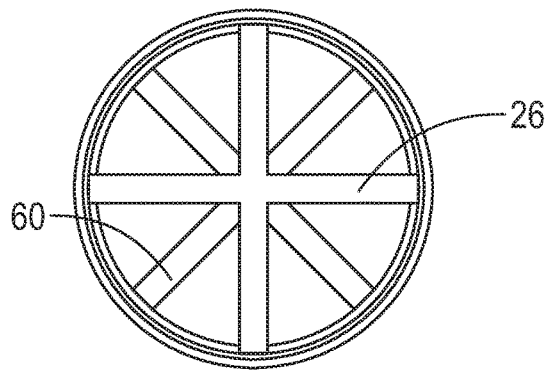
FIG. 6 shows a top plan view of components of a filtration system in accordance with the present disclosure.

In a preferred embodiment, the scupper 94 is defined by a vertically positioned outer tube 20 installed within an opening in the roadway 90. The outer tube 20 is preferably cylindrical in shape, though other shapes may be utilized. As used herein, the "outer tube" refers to a tube positioned within an opening in a roadway and secured directly to the roadway 90. As discussed below, some embodiments may include an inner tube 50 having a diameter smaller than a diameter of the outer tube so that the inner tube 50 fits inside the outer tube 20, as shown in FIG. 5. In a preferred embodiment, as shown in FIGS. 1 and 5, the outer tube 20 may be cast into concrete, asphalt, or similar construction material used for the bridge deck 90 during construction of the roadway such that an outer surface 32 of the outer tube 20 directly contacts an interior portion of the roadway construction material. To prevent the outer tube 20 from moving, rotating, or becoming dislodged from the roadway after the tube 20 is cast in place during roadway construction, the outer surface 32 of the outer tube 20 may have protrusions 33 or tabs extending outwardly from the surface 32. Such protrusions 33 may take different shapes and may be arranged in different configurations around the outer surface 32 of the tube 20 for the purpose of permanently securing the outer tube 20 in place within the roadway 90.

As shown in FIGS. 2 and 3, the filtration media 22 is preferably contained within a mesh sock made of a flexible material to contain the media while allowing water to flow through the media. The mesh sock is placed inside the outer tube 20 so that water runoff from the top surface 92 of the bridge deck 90 gravity flows downward through the outer tube 20, thereby flowing through the filtration media 22 to treat the water. When filled with filtration media 22, the mesh sock preferably has a generally cylindrical shape so that the sock fits into the outer tube 20 and conforms to the shape of the outer tube 20 so that water flow does not bypass the filtration media 22. Alternatively, the filtration media 22 may be placed within a cartridge or similar rigid container that is sized to fit inside the tube 20 and that confines the media within the cartridge but allows liquid to flow through the cartridge or container for filtration of the liquid stream.

The outer tube 20 preferably has a lower support structure 42 secured to a lower end of the outer tube 20. As shown in FIG. 2, the support structure 42 extends transversely across an opening 36 at the lower end of the outer tube 20 and supports the mesh sock containing the filtration media 22, as shown in FIG. 1, while allowing water to flow through the outer tube 20. In a preferred embodiment, the support structure 42 comprises two perpendicular bars forming an "X" shape. In embodiments in which the roadway 90 is a bridge deck, as shown in FIG. 9, water may be discharged directly from the deck 90 through the opening 36 at the lower end of the outer tube 20. In embodiments in which the roadway 90 is an overland roadway directly contacting land, piping may be connected to the lower end of the outer tube 20 to convey treated water to a discharge point after the water exits the opening 36 at the lower end of the tube.

In a preferred embodiment, the system further comprises a cap 24 removably secured to an upper end of the outer tube 20. When secured in place, the cap 24 prevents removal of the mesh sock containing the filtration media 22 but allows water to gravity flow downward into an opening 34 at the upper end of the outer tube 20 and through the tube 20. As shown in FIGS. 2 and 3, the cap 24 preferably has two perpendicular bars 26 forming an "X" shape, which leaves openings providing sufficient area through which water may flow so as to not restrict drainage capacity, but which may prevent larger objects such as road debris from blocking flow into the outer tube 20. In a preferred embodiment, the cap 24 has a male threaded section 28 configured to mate with a female threaded section 30 at the upper end of the outer tube 20 in order to removably secure the cap 24 to the upper end of the outer tube 20. Alternatively, the cap 24 may be removably secured to the upper end of the outer tube 20 by any other suitable fastener such as clamps, clips, magnets, or a cam lock mechanism. The cap 24 may be removed in order to periodically remove and replace the filtration media 22 and then re-secured to the upper end of the outer tube 20. Preferably, the bars 26 in the cap 24 are raised slightly above an outer perimeter 27 of the cap 24. When the cap 24 is secured in place, the bars 26 then extend upward a short distance above the top surface 92 of the roadway 90 to form an elevated edge 38, as best seen in FIGS. 1 and 5. The edge 38 is preferably raised approximately ⅛ to ¼ of an inch above the roadway surface 92 and may help to prevent debris flowing with stormwater runoff along the surface 92 of the roadway 90 from clogging the opening 34 at the upper end of the outer tube 20. In particular, the edge 38 may prevent obstruction of the opening 34 by any flat material that could block the opening 34.

Figure 4:
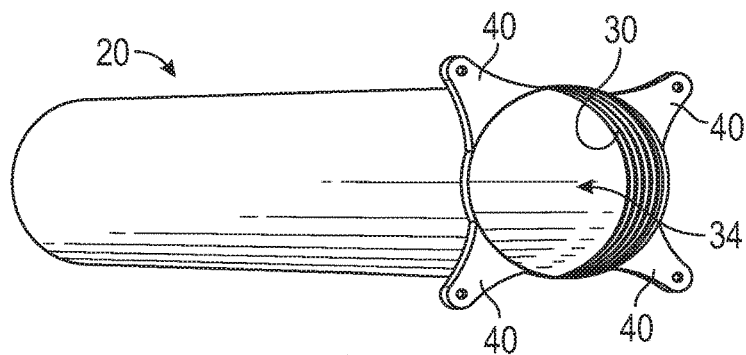
FIG. 4 shows a perspective view of a component of a filtration system in accordance with the present disclosure.

FIG. 1 shows the outer tube 20 cast into the bridge deck 90, which is typically done during initial construction of the roadway. FIGS. 2 and 3 show the outer tube 20 removed from the roadway 90 along with the filtration media 22 and the cap 24. The present system may also be retrofitted to existing bridge decks. Many existing bridges have scupper holes in the bridge deck to allow direct drainage of untreated water from the driving surface. In one embodiment, as shown in FIG. 4, the outer tube 20 may have one or more flanges 40 at the upper end of the outer tube 20 to allow the filtration system to be retrofitted to existing scupper holes. The outer tube 20 may be inserted into an existing scupper hole in a bridge deck 90, and the flanges 40 can be fastened to the bridge deck 90. The flanges 40 each have at least one hole though which concrete inserts, screws, bolts, or any other suitable fastener may be used to secure the flange 40 to the surface 92 of the deck 90. Once fastened to the bridge deck 90, the outer tube 20 will not rotate and water runoff will not bypass the outer tube 20. Preferably, the outer tube 20 has separate flanges 40 having spaces between flanges 40 to allow water runoff to flow between the flanges 40 directly into the opening 34 at the upper end of the outer tube 20.

In a preferred embodiment, as shown in FIGS. 5-8, the filtration system comprises an outer tube 20 and an inner tube 50 disposed within the outer tube 20 and removably secured to the outer tube 20. The outer tube 20 is installed within an opening in the roadway 90 and defines the scupper. The filtration media 22 is disposed within the inner tube 50. The outer tube 20 is permanently installed in the roadway 90, and the inner tube 50 may be removed periodically to replace the filtration media 22, which may be replaced by replacing the inner tube 50 with a new inner tube having new filtration media pre-installed within the inner tube. This may allow filtration media 22 in a plurality of inner tubes 50 spaced along a length of roadway 90 to be replaced quickly.

Figure 7:
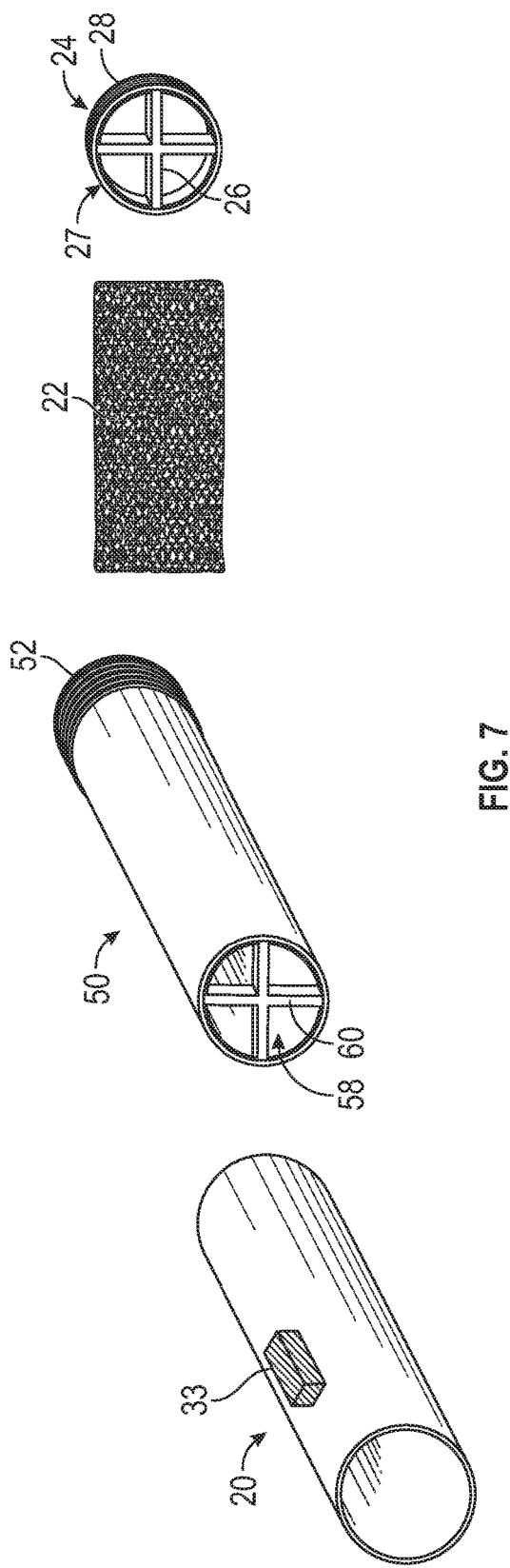
FIG. 7 shows a perspective view of components of a filtration system in accordance with the present disclosure.
Figure 8:
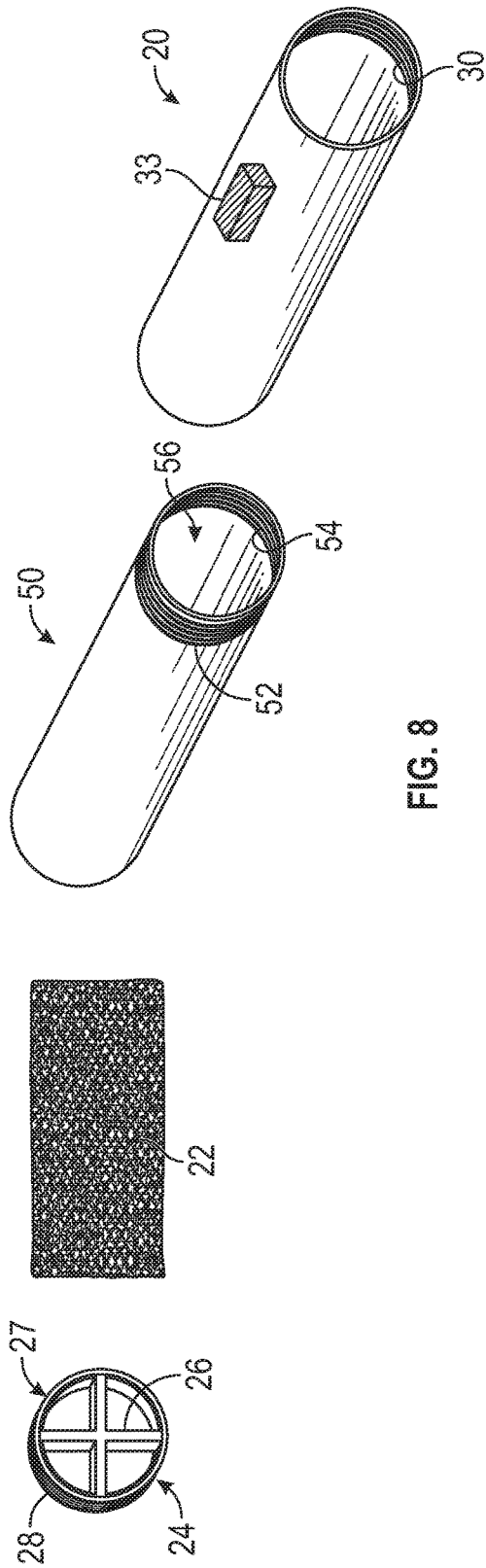
FIG. 8 shows a perspective view of components of a filtration system in accordance with the present disclosure.

In this embodiment, the inner tube 50 preferably has a lower support structure 60 secured to a lower end of the inner tube 50, while the lower end of the outer tube 20 preferably lacks a support structure. In addition, the cap 24 is removably secured to an upper end of the inner tube 50. In a preferred embodiment, as shown in FIG. 5, the inner tube 50 is removably secured to the outer tube 20 and the cap is removably secured to the inner tube 50 via threads. As shown in FIGS. 7 and 8, the upper end of the inner tube 50 has both a male threaded section 52 and a female threaded section 54 around an opening 56 at the upper end. The male threads 52 of the inner tube 50 are configured to mate with the female threads 30 of the outer tube 20 when the inner tube 50 is inserted into the outer tube 20. In addition, the male threads 28 of the cap 24 are configured to mate with the female threads 54 of the inner tube 50. Before installing the inner tube 50 inside the outer tube 20, the mesh sock holding the filtration media 22 is inserted into the inner tube 50 and the cap 24 is threaded into the inner tube 50. Once the outer tube 20 has been cast into the bridge deck 90 or otherwise fastened to the bridge deck so that the outer tube 20 will not rotate, the inner tube 50 may then be inserted into the outer tube 20 and rotated by rotating the bars 26 on the cap 24 until the inner tube 50 is threaded into the outer tube 20. To facilitate later removal of the inner tube 50 from the outer tube 20, the male threads 28 of the cap 24 and the female threads 54 of the inner tube 50 may be left-handed threads.

Figure 10:
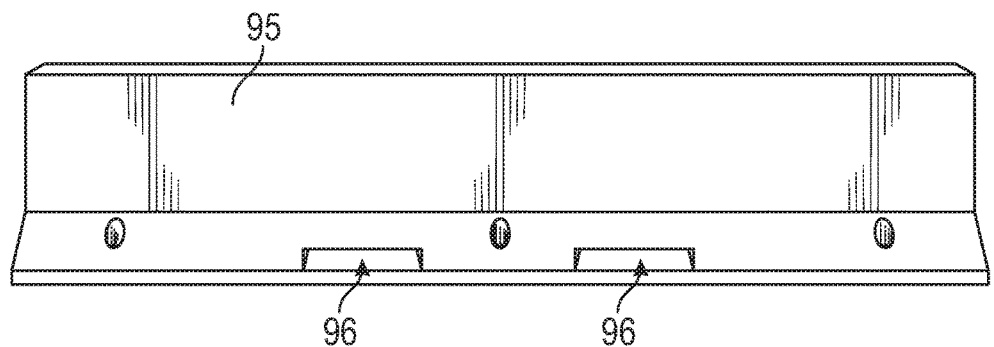
FIG. 10 shows a perspective view of a component of a filtration system in accordance with the present disclosure.

In a preferred embodiment, as shown in FIGS. 9 and 10, the filtration system further comprises a barrier rail 95 that extends upwardly from the top surface 92 of the roadway 90. The barrier rail 95 extends along at least one side of the roadway 90 outside of traffic lanes with a shoulder area of the roadway between the rail 95 and traffic lanes. As best seen in FIG. 9, the barrier rail 95 has a second scupper 96 extending horizontally through the rail 95 and positioned at a defined distance above the top surface 92 of the roadway 90. The distance is defined by a portion 97 of the barrier 95 located between the horizontal scupper 96 and the roadway surface 92. The roadway 90 slopes slightly downward toward the barrier rail 95 to form a low point in the roadway, which is located in the shoulder area of the roadway. The vertical scupper 94 formed by the outer tube 20 is located in the area of the low point so that stormwater runoff will gravity flow through the vertical scupper 94. Because the filtration media 22 restricts water flow through the vertical scupper 94, the system will have a maximum capacity, or filtration rate, based on properties of the media 22 selected, the number of vertical scuppers 94 per unit of roadway area, and the diameter of the scuppers 94. In heavy rainfall events, if the vertical scuppers 94 located along the roadway 90 cannot provide sufficient capacity to prevent stormwater accumulation on the surface 92 of the roadway 90, then the horizontal scupper 96 in the barrier rail 95 will function as a bypass allowing untreated stormwater to be discharged from the surface 92 of the roadway 90. This is a safety feature to prevent accumulation of water in traffic lanes. The road 90, barrier rail 95, and horizontal scupper 96 are designed so that accumulation will only occur outside of traffic lanes before accumulated water begins to flow through the horizontal scupper 96 in the rail 95. The roadway 90 is sloped slightly downward toward the rail 95 to prevent stormwater accumulation in traffic lanes and limit accumulation to areas outside traffic lanes such as the shoulder area of the roadway. If accumulation occurs, the accumulated water will flow through the bypass 96 before accumulating in traffic lanes. The roadway 90 is designed so that only a defined area 98 of the roadway 90 will hold accumulated runoff before water flows through the bypass scupper 96. This area 98 is located outside of traffic lanes so that vehicles will not drive through standing water.

The present filtration system preferably utilizes a plurality of spaced scuppers 94 each having filtration media 22 inside the scupper along a length of roadway 90 for treating stormwater runoff from any desired length of roadway. In embodiments utilizing a barrier rail 95, the system preferably utilizes a plurality of spaced horizontal bypass scuppers 96 along a length of the barrier rail. The present system allows for the filtration media 22 to be installed safely below the driving surface 92 of a bridge deck 90 or other type of roadway. The present system allows for simple and quick inspection of the filtration media 22, as well simple and quick removal and replacement of filtration media 22, which can be accessed from the bridge deck 90. In a preferred embodiment, the outer tube 20, the inner tube 50, and the cap 24 are constructed of stainless steel, though other suitable construction materials may be utilized, including plastic such as PVC.

A method of filtering liquid runoff from a roadway 90 is also provided. In accordance with the present method, a vertical scupper 94 is first formed in a roadway 90. The scupper 94 extends through the roadway 90 between a top surface 92 of the roadway and a bottom side 93 of the roadway 90. The scupper 94 may be formed during initial construction of the roadway or at a later time to retrofit the roadway with the present system. A filtration media 22 is then disposed within the scupper 94. The type and amount of filtration media 22 utilized may be selected depending on a specific application and may be dependent on a required filtration capacity and specific contaminants targeted for removal from a liquid runoff stream. The liquid runoff may then be filtered by allowing the runoff to gravity flow through the filtration media 22 disposed within the scupper 94.

In a preferred embodiment, the scupper 94 is defined by an outer tube 20 installed within an opening in the roadway 90. The tube 20 may be cast in concrete or similar material used in construction of the roadway 90 or may be later installed in an existing scupper 94 in an existing roadway 90. In a preferred embodiment, an inner tube 50 is installed within the outer tube 20 and is removable secured to the outer tube 20, and the filtration media 22 is installed within the inner tube 50. A cap 24 may be installed after installation of the media 22. The liquid runoff may then gravity flow downward through an opening 56 at an upper end of the inner tube 50, through the filtration media 22, and then discharge through an opening 58 at a lower end of the inner tube 50. The filtration media 22 removes contaminants from the liquid stream, which may then be discharged directly to the environment without further treatment.

In a preferred embodiment, the present method may further comprise installing a barrier rail 95 extending upwardly from the top surface 92 of the roadway 90 and having a second scupper 96 that extends horizontally through the barrier rail 95. The horizontal scupper 96 is positioned above the surface 92 of the roadway 90 to allow accumulated water to bypass the vertical scupper 94 in cases of heavy rainfall that may surpass the filtration capacity of the vertical scupper 94. If runoff exceeds system capacity, the runoff may accumulate at a low point in the roadway 90 adjacent to the barrier rail 95, the base 97 of which causes liquid to accumulate. Untreated liquid may then be discharged through the horizontal scupper 96 to prevent accumulation in traffic lanes.

In alternative embodiments, the system may also be installed on other impervious surfaces such as in elevated walkways. For instance, the system may be installed on elevated or ground-level walkways constructed of impervious material and located in refineries, plants, or other industrial facilities. In such facilities, small leaks of hydrocarbons or other chemicals may occur, and the present system may be utilized to treat liquid runoff carrying such chemicals before discharge from the walkway. Liquid runoff may occur from rainfall or from washing down equipment in the facility. In such embodiments, a raised edge may be installed along both sides of a walkway in order to force liquid to gravity flow through vertical scuppers located in the walkway.

It is understood that versions of the inventive subject matter of the present disclosure may come in different forms and embodiments. Additionally, it is understood that one of skill in the art would appreciate these various forms and embodiments as falling within the scope of the inventive subject matter disclosed herein.

What is claimed is:

1. A filtration system comprising:
   an elevated bridge deck having a scupper extending through the bridge deck between a top surface of the bridge deck and a bottom side of the bridge deck; and
   a filtration media disposed within the scupper.

2. The filtration system of claim 1, wherein the scupper is defined by a tube installed within the bridge deck.

3. The filtration system of claim 2, wherein the tube has a lower support structure secured to a lower end of the tube, wherein the lower support structure extends transversely across an opening at the lower end of the tube.

4. The filtration system of claim 2, further comprising a cap removably secured to an upper end of the tube.

5. The filtration system of claim 4, wherein the upper end of the tube has a female threaded section, and the cap has a male threaded section configured to mate with the female threaded section.

6. The filtration system of claim 2, wherein an upper end of the tube has a plurality of separate flanges having spaces located between each of the flanges and adapted to allow liquid runoff to gravity flow from the top surface of the bridge deck, through the spaces, and into the tube.

7. The filtration system of claim 1, wherein the bridge deck comprises a barrier rail having a second scupper extending horizontally through the barrier rail and positioned above the top surface of the bridge deck, wherein the bridge deck slopes downward toward the barrier rail to form a liquid runoff accumulation area located between a traffic lane of the bridge deck and the barrier rail, and wherein the bridge deck, the barrier rail, and the second scupper are adapted to prevent liquid accumulation outside of the liquid runoff accumulation area.

8. A filtration system comprising:
   an elevated bridge deck having a scupper extending through the bridge deck between a top surface of the bridge deck and a bottom side of the bridge deck, wherein the scupper is defined by an outer tube installed within the bridge deck;
   an inner tube disposed within the outer tube and removably secured to the outer tube; and
   a filtration media disposed within the inner tube.

9. The filtration system of claim 8, wherein the inner tube has a lower support structure secured to a lower end of the inner tube, wherein the lower support structure extends transversely across an opening at the lower end of the inner tube.

10. The filtration system of claim 8, further comprising a cap removably secured to an upper end of the inner tube.

11. The filtration system of claim 10, wherein an upper end of the outer tube has a female threaded section, wherein the upper end of the inner tube has a male threaded section and has a female threaded section, and wherein the cap has a male threaded section, wherein the male threaded section of the inner tube is configured to mate with the female threaded section of the outer tube, and the male threaded section of the cap is configured to mate with the female threaded section of the inner tube.

12. The filtration system of claim 11, wherein the male threaded section of the cap and the female threaded section of the inner tube have left-handed threads.

13. The filtration system of claim 8, wherein an upper end of the outer tube has a plurality of separate flanges having spaces located between each of the flanges and adapted to allow liquid runoff to gravity flow from the top surface of the bridge deck, through the spaces, and into the inner tube.

14. The filtration system of claim 8, wherein the bridge deck comprises a barrier rail having a second scupper extending horizontally through the barrier rail and positioned above the top surface of the bridge deck, wherein the bridge deck slopes downward toward the barrier rail to form a liquid runoff accumulation area located between a traffic lane of the bridge deck and the barrier rail, and wherein the bridge deck, the barrier rail, and the second scupper are adapted to prevent liquid accumulation outside of the liquid runoff accumulation area.

15. A method of filtering liquid runoff from a an elevated bridge deck, said method comprising the steps of:
   forming a scupper in an elevated bridge deck, wherein the scupper extends through the bridge deck between a top surface of the bridge deck and a bottom side of the bridge deck;
   installing a filtration media within the scupper; and
   filtering liquid runoff from the bridge deck by allowing the runoff to gravity flow through the filtration media and discharge directly to the environment below the bridge deck without further treatment.

16. The method of claim 15, wherein the step of forming a scupper in a bridge deck comprises installing an outer tube within an opening in the bridge deck, wherein the outer tube defines the scupper.

17. The method of claim 16, further comprising the steps of installing an inner tube within the outer tube and removably securing the inner tube to the outer tube, wherein the step of installing a filtration media within the scupper comprises installing the filtration media within the inner tube.

18. The method of claim 17, further comprising the step of removably securing a cap to an upper end of the inner tube.

19. The method of claim 17, further comprising the step of installing a barrier rail extending upwardly from the top surface of the bridge deck, wherein the barrier rail has a second scupper extending horizontally through the barrier rail and positioned above the top surface of the bridge deck, wherein the bridge deck slopes downward toward the barrier rail to form a liquid runoff accumulation area located between a traffic lane of the bridge deck and the barrier rail, and wherein the bridge deck, the barrier rail, and the second scupper are adapted to prevent liquid accumulation outside of the liquid runoff accumulation area.

20. The method of claim 15, further comprising the step of installing a barrier rail extending upwardly from the top surface of the bridge deck, wherein the barrier rail has a second scupper extending horizontally through the barrier rail and positioned above the top surface of the bridge deck, wherein the bridge deck slopes downward toward the barrier rail to form a liquid runoff accumulation area located between a traffic lane of the bridge deck and the barrier rail, and wherein the bridge deck, the barrier rail, and the second scupper are adapted to prevent liquid accumulation outside of the liquid runoff accumulation area.

* * * * *